United States Patent
Kriegel

(10) Patent No.: US 9,901,866 B2
(45) Date of Patent: Feb. 27, 2018

(54) MEMBRANE SEPARATION PROCESS AND MEMBRANE PLANT FOR ENERGY-EFFICIENT PRODUCTION OF OXYGEN

(71) Applicant: FRAUNHOFER-GESELLSCHAFT ZUR FÖRDERUNG DER ANGEWANDTEN FORSCHUNG E. V., München (DE)

(72) Inventor: Ralf Kriegel, Kahla (DE)

(73) Assignee: FRAUNHOFER-GESELLSCHAFT ZUR FOERDERUNG DER ANGEWANDTEN FORSCHUNG E. V., Munich (DE)

( * ) Notice: Subject to any disclaimer, the term of this patent is extended or adjusted under 35 U.S.C. 154(b) by 0 days.

(21) Appl. No.: 14/904,780

(22) PCT Filed: Jul. 15, 2014

(86) PCT No.: PCT/DE2014/100255
§ 371 (c)(1),
(2) Date: Jan. 13, 2016

(87) PCT Pub. No.: WO2015/007272
PCT Pub. Date: Jan. 22, 2015

(65) Prior Publication Data
US 2016/0136571 A1      May 19, 2016

(30) Foreign Application Priority Data

Jul. 17, 2013   (DE) .................. 10 2013 107 610

(51) Int. Cl.
*B01D 53/22*     (2006.01)
*B01D 71/02*     (2006.01)
(Continued)

(52) U.S. Cl.
CPC .......... *B01D 53/228* (2013.01); *B01D 53/22* (2013.01); *B01D 53/227* (2013.01); *B01D 63/06* (2013.01);
(Continued)

(58) Field of Classification Search
CPC .... B01D 53/22; B01D 53/225; B01D 53/227; B01D 53/228; B01D 2053/223;
(Continued)

(56) References Cited

U.S. PATENT DOCUMENTS 5,108,465 A * 4/1992 Bauer .................... B01D 53/22
                                                                95/54
5,599,383 A * 2/1997 Dyer ..................... B01D 53/22
                                                                96/10

(Continued)

FOREIGN PATENT DOCUMENTS

EP    0024718 A2    3/1981
EP    0108843 A1    5/1984
(Continued)

OTHER PUBLICATIONS

Fu, C., Gundersen, T., "Using exergy analysis to reduce power consumption in air separation units for oxy-combustion processes", Energy 44 (2012) 1, 60-68.

(Continued)

*Primary Examiner* — Jason M Greene
(74) *Attorney, Agent, or Firm* — Abel Law Group, LLP

(57) ABSTRACT

The invention relates to a membrane separation process for energy-efficient generation of oxygen from fresh air. In the process, mixed conducting membranes in vacuum operation are used, the fresh air is discharged as waste air after separation of the oxygen, at least 85% of the thermal energy required for heating the fresh air is acquired by utilizing the waste heat of the waste air and/or of the obtained oxygen, the (Continued)

rest of the heating of the fresh air being realized through external energy supply, and a ratio of fresh air to generated oxygen in normal operation is adjusted to a range of from 6:1 to 25:1.

17 Claims, 4 Drawing Sheets

(51) Int. Cl.
    *C01B 13/02*     (2006.01)
    *B01D 63/06*     (2006.01)

(52) U.S. Cl.
    CPC .......... *B01D 71/02* (2013.01); *C01B 13/0251* (2013.01); *B01D 71/024* (2013.01); *B01D 2053/223* (2013.01); *B01D 2256/12* (2013.01); *B01D 2259/65* (2013.01); *B01D 2313/26* (2013.01); *B01D 2313/38* (2013.01); *C01B 2210/0048* (2013.01); *Y02P 20/126* (2015.11); *Y02P 20/129* (2015.11); *Y02P 20/57* (2015.11); *Y02P 20/572* (2015.11)

(58) Field of Classification Search
    CPC ........ B01D 63/02; B01D 63/06; B01D 69/04; B01D 71/02; B01D 71/024; B01D 2256/12; B01D 2259/65; B01D 2313/38; B01D 2319/02; B01D 2319/022; B01D 2319/04; C01B 13/0251
    See application file for complete search history.

(56) References Cited

U.S. PATENT DOCUMENTS

| | | | |
|---|---|---|---|
| 5,753,007 A | 5/1998 | Russek | |
| 5,935,298 A * | 8/1999 | Prasad | B01D 53/22 95/117 |
| 6,702,570 B2 | 3/2004 | Shah et al. | |
| 8,349,214 B1 | 1/2013 | Kelly et al. | |
| 8,506,678 B2 | 8/2013 | Meulenberg et al. | |
| 8,945,276 B2 * | 2/2015 | Wynn | B01D 53/22 55/342 |
| 9,180,419 B2 | 11/2015 | Kelly et al. | |
| 2002/0127177 A1 * | 9/2002 | Gottzmann | B01D 53/228 423/650 |
| 2004/0002030 A1 | 1/2004 | Shah et al. | |
| 2010/0071381 A1 | 3/2010 | Rollins, III | |
| 2010/0205968 A1 | 8/2010 | Graeber et al. | |
| 2010/0251888 A1 * | 10/2010 | Fekety | B01D 53/228 95/54 |
| 2010/0263377 A1 * | 10/2010 | Meulenberg | B01D 53/22 60/645 |
| 2010/0300111 A1 | 12/2010 | Graeber et al. | |

FOREIGN PATENT DOCUMENTS

| | | |
|---|---|---|
| EP | 2026004 A1 | 2/2009 |
| EP | 2067937 A2 | 6/2009 |
| WO | 2008014481 A1 | 1/2008 |
| WO | 2009065374 A2 | 5/2009 |

OTHER PUBLICATIONS

PSA: Dietrich, W., Scholz, G., Voit, J., "Linde-Verfahren zur Gewinnung von Sauerstoff und Ozon für eine Zellstoff-und Papierfabrik [Linde process for obtaining oxygen and ozone for a pulp and paper mill]", Berichte aus Technik und Wissenschaft 80 (2000), 3-8.
Sunarso, J., Baumann, S., Serra, J.M., Meulenberg, W.A., Liu, S., Lin, Y.S., Diniz da Costa, J.C., "Mixed ionic-electronic conducting (MIEC) ceramic-based membranes for oxygen separation", Journal of Membrane Science 320 (2008), 13-41.
Armstrong, P.A., Bennett, D.L, Foster. E.P., Stein. V.E., "ITM Oxygen: The New Oxygen Supply for the New IGCC Market", Gasification Technologies 2005, San Francisco, Oct. 9-12, 2005.
Kriegel, R., "Einsatz keramischer BSCF-Membranen in einem transportablen Sauerstoff-Erzeuger [Use of ceramic BSCF membranes in a portable oxygen generator]", J. Kriegesmann (ed.), DKG Handbuch Technische Keramische Werkstoffe, Loseblattwerk, HvB-Verlag Ellerau, 119. supplement, Nov. 2010, Chapter 8.10.1.1, pp. 1-46.
Stadler, H., Beggel, F., Habermehl, M., Persigehl, B., Kneer, R., Modigell, M., Jeschke, P., "Oxyfuel coal combustion by efficient integration of oxygen transport membranes", International Journal of Greenhouse Gas Control 5 (2011), 7-15.
Nazarko, J., Weber, M., Riensche, E., Stolten, D., "Oxygen Supply for Oxyfuel Power Plants by Oxy-Vac-Jül Process", 2nd International Conference on Energy Process Engineering, Efficient Carbon Capture for Coal Power Plants, Jun. 20-22, 2011, Frankfurt/Main.
Pfaff, I., Kather, A., "Comparative Thermodynamic Analysis and Integration Issues of CCS Steam Power Plants Based on Oxy-Combustion with Cryogenic or Membrane Based Air Separation", Energy Procedia 1 (2009) 1, 495-502.
Vente, Jaap F., Haije, Wim. G., Ijpelaan, Ruud, Rusting, Frans T., "On the full-scale module design of an air separation unit using mixed ionic electronic conducting membranes", Journal of Membrane Science 278 (2006), 66-71.
Baumann, S., Serra, J.M., Lobera, M.P., Escolástico, S., Schulze-Küppers, F., Meulenberg, W.A., "Ultrahigh oxygen permeation flux through supported Ba0.5Sr0.5Co0.8Fe0.2O3-delta membranes", Journal of Membrane Science 377 (2011) 198-205.

* cited by examiner

MEMBRANE SEPARATION PROCESS AND MEMBRANE PLANT FOR ENERGY-EFFICIENT PRODUCTION OF OXYGEN

BACKGROUND OF THE INVENTION

1. Field of the Invention

The invention relates to a membrane separation process and a membrane plant for energy-efficient oxygen generation using mixed conducting ceramic membranes.

2. Discussion of Background Information

At the present time, conventional production of oxygen is preferably carried out through pressure swing adsorption (PSA) or cryogenic air separation (Linde® process). Large scale plants which are highly energy-optimized attain specific energy consumptions of a minimum of 0.34 kWh$_{el}$/Nm$^3$ O$_2$ (cryogenically: Fu, C., Gundersen, T., "Using exergy analysis to reduce power consumption in air separation units for oxy-combustion processes", Energy 44 (2012) 1, 60-68) or 0.36 kWh$_{el}$/Nm$^3$ O$_2$ (PSA: Dietrich, W., Scholz, G., Voit, J., "Linde-Verfahren zur Gewinnung von Sauerstoff und Ozon für Zellstoff-und Papierfabrik [Linde process for obtaining oxygen and ozone for a pulp and paper mill]", Berichte aus Technik und Wissenschaft 80 (2000), 3-8). However, this specific energy consumption of conventional plants increases sharply with the aimed-for purity of the oxygen product gas and with decreasing plant size. Accordingly, smaller PSA plants with an output of up to approximately 1000 Nm$^3$ O$_2$/h need at least 1.0 kWh$_{el}$/Nm$^3$ O$_2$, but only deliver 95 percent by volume of oxygen. Owing to the high specific energy consumption, a decentralized oxygen generation is not economically feasible for many applications in combustion and gasification technology. Supply via flasks or liquid tanks, particularly with continuous oxygen requirement, is even less economical.

An alternative method for the production of oxygen is based on a membrane separation process at high temperatures. Mixed conducting ceramic membranes (MIEC— Mixed Ionic Electronic Conductors) are used for this purpose and enable a highly selective separation of oxygen. The oxygen transport relies on the transporting of oxide ions through the gastight ceramic material and the transporting of electronic charge carriers (electrons or electron holes) taking place simultaneously. Since the 1980s, a large number of ceramic materials have been investigated with respect to oxygen transport and further material characteristics (Sunarso, J., Baumann, S., Serra, J. M., Meulenberg, W. A., Liu, S., Lin, Y. S., Diniz da Costa, J. C., "Mixed ionic-electronic conducting (MIEC) ceramic-based membranes for oxygen separation", Journal of Membrane Science 320 (2008), 13-41).

Oxygen permeation through an MIEC membrane can be described by Wagner's equation and is determined primarily through the ambipolar conductivity of the material at operating temperature, the membrane thickness and the driving force. The latter is given by the logarithmic ratio of oxygen partial pressure in the feed gas $p_O(h)$ to oxygen partial pressure in the sweep gas $p_O(l)$ or in the permeate. Consequently, in a given material with constant membrane thickness and fixed temperature, the oxygen flux through a MIEC membrane is proportional to $\ln\{p_O(h)/p_O(l)\}$. Accordingly, doubling $p_O(h)$ on the feed gas side results in the same increase in oxygen flux as halving $p_O(l)$ on the permeate side or sweep gas side. Consequently, in order to generate pure oxygen in plants utilizing membrane technology, the air can be compressed or the oxygen can be sucked out by vacuum.

Of course, combined processes are also possible (Armstrong, P. A., Bennett, D. L., Foster. E. P., Stein. V. E., "ITM Oxygen: The New Oxygen Supply for the New IGCC Market", Gasification Technologies 2005, San Francisco, 9-12 Oct. 2005). Compression of air is preferred for commercial plants inter alia because compressors are, inter alia, generally cheaper and more available than vacuum generators.

The technological feasibility of oxygen generation with MIEC membranes has already been demonstrated on a small scale through the construction and operation of an electrically heated, portable oxygen generator with electrically operated vacuum pump (Kriegel, R., "Einsatz keramischer BSCF-Membranen in einem transportablen Sauerstoff-Erzeuger [Use of ceramic BSCF membranes in a portable oxygen generator]", J. Kriegesmann (ed.), DKG Handbuch Technische Keramische Werkstoffe, Loseblattwerk, HvB-Verlag Ellerau, 119. Erg.-Lieferung, November 20120, Chapter 8.10.1.1, pages 1-46). However, at 1.6 kWh/Nm$^3$ O$_2$, the specific energy consumption of the device described therein was appreciably higher than in the conventional processes; moreover, the thermal energy requirement was not taken into account.

The own energy requirement for MIEC membrane separation results on the one hand from the thermal energy required for maintaining the high temperature of 800-900° C. at the membrane. On the other hand, compression energy for gas compression is needed to generate the driving force for oxygen transport. If the air is compressed on the feed side, it is necessary to expand the compressed, O$_2$-depleted air via a gas turbine in order to recover the expended compression energy. As an alternative to this overpressure process, the oxygen can be obtained through vacuum suction. The vacuum process requires less compression energy, but this compression energy cannot be recovered. Corresponding processes have already been described a number of times in the field of power plant engineering (WO 2008/014481 A1, EP 2 067 937 A2, WO 2009/065374 A3, EP 2 026 004 A1). Only WO 2009/065374 A3 claims a vacuum process.

In the power plant domain, the own energy requirement of MIEC membrane plants is influenced considerably by integration into the power plant. Accordingly, depending upon the degree of integration of the MIEC membrane plant, the calculated own energy requirement for the overpressure process fluctuates between 0.031 and 0.134 kWh$_{el}$/Nm$^3$ O$_2$ (Stadler, H., Beggel, F., Habermehl, M., Persigehl, B., Kneer, R., Modigell, M., Jeschke, P., "Oxyfuel coal combustion by efficient integration of oxygen transport membranes", International Journal of Greenhouse Gas Control 5 (2011), 7-15). An energy requirement of a minimum of 0.14 kWh$_{el}$/Nm$^3$ O$_2$ has been specified for the vacuum process (Nazarko, J., Weber, M., Riensche, E., Stolten, D., "Oxygen Supply for Oxyfuel Power Plants by Oxy-Vac-Jül Process", 2nd International Conference on Energy Process Engineering, Efficient Carbon Capture for Coal Power Plants, 20-22 Jun. 2011, Frankfurt/Main). However, other authors have found no noticeable difference for the membrane process for cryogenic air separation (Pfaff, I., Kather, A., "Comparative Thermodynamic Analysis and Integration Issues of CCS Steam Power Plants Based on Oxy-Combustion with Cryogenic or Membrane Based Air Separation", Energy Procedia 1 (2009) 1, 495-502). These sharply varying or contradictory results which were obtained under widely different boundary conditions are obviously not suitable for energy assessment for an autonomous membrane plant without coupling to a power plant.

In the studies mentioned above, modeling calculations are carried out with complex software tools to identify and debate dependencies of the own energy requirement of the membrane process on air throughput, degree of separation of oxygen from the supplied air (feed gas), and procedural integration into the power plant. However, no simple, comprehensible relationship between influencing parameters and the specific energy consumption of a MIEC membrane plant has been specified or deduced because modeling is always carried out in the context of linking to the power plant. Accordingly, it has not been possible heretofore to predict the optimal operating point for a planned MIEC membrane plant at a reasonable expenditure or, consequently, to configure all components to this optimal operating point.

According to the prior art, the area-normalized oxygen permeation of the membrane material is considered crucial for economical operation of a MIEC membrane plant. Consequently, a minimum oxygen permeation of 10 Nml $(cm^2 \cdot min)$ has been postulated for economical operation (Vente, Jaap F., Haije, Wim. G., Ijpelaan, Ruud, Rusting, Frans T., "On the full-scale module design of an air separation unit using mixed ionic electronic conducting membranes", *Journal of Membrane Science* 278 (2006), 66-71). Consequently, current work for developing MIEC membranes is almost entirely oriented to the highest possible oxygen permeation (Baumann, S., Serra, J. M., Lobera, M. P., Escolástico, S., Schulze-Küppers, F., Meulenberg, V. A., "Ultrahigh oxygen permeation flux through supported $Ba_{0.5}Sr_{0.5}Co_{0.8}Fe_{0.2}O_{3-\delta}$ membranes", *Journal of Membrane Science* 377 (2011) 198-205). High feed-throughputs and pure oxygen as feed are used for this purpose; the influence of $O_2$ depletion in the feed on $O_2$ permeation and on the energy demand is not taken into account. A comprehensive assessment of energy consumption of autonomous, self-contained MIEC membrane plants has not been achieved to date.

SUMMARY OF THE INVENTION

It is the object of the invention to indicate a possibility for substantially increasing the energy efficiency of the MIEC membrane process for oxygen production, particularly with self-contained MIEC membrane plants, while avoiding the drawbacks of the prior art.

According to the invention, this object is met with a membrane plant for energy-efficient production of oxygen from fresh air comprising a housing with an input and an output, MI EC membranes and a vacuum pump in that a metal connection plate is arranged in the housing, which metal connection plate comprises a vacuum-tight hollow space structure in which the MIEC membranes which are closed on one side are arranged in a gastight manner. The housing is divided into chambers by at least one dividing wall, each chamber having a stationary regenerator, a supplemental heater and a portion of the MIEC membranes, and an orifice is provided in every dividing wall so as to ensure passage for the fresh air from the chamber downstream of the input to the chamber upstream of the output. Further, a fan is arranged upstream of the input and a fan is arranged downstream of the output, and the fans have opposite suction directions. Further, a regenerative heat exchanger is provided, wherein partial regions are associated with the input and other partial regions are associated with the output, and the vacuum pump communicates with the hollow space structure for extracting the obtained oxygen.

A substantial advantage of the arrangement according to the invention consists in that the housing of the membrane plant need not be pressure-tight. The fans with opposite suction directions can advantageously switch running directions, or corresponding air flaps can be provided so that the streaming direction of the air flow is reversible. A further advantageous configuration consists in that the input and output with associated fans are arranged on a rotary slide. The permanent rotation achieves an effect identical to that achieved by reversing the streaming direction with input and output remaining stationary. It is also advantageous when the housing is divided into a plurality of identically constructed chambers, wherein the input and output extend in each instance over one third of the chambers and one third of the chambers are accordingly in an idle phase.

With a membrane separation method for energy-efficient production of oxygen from heated fresh air using mixed conducting membranes in vacuum operation, wherein the fresh air is discharged as waste air after separation of the oxygen, the above-stated object is also met according to the invention in that at least 85% of the thermal energy required for heating the fresh air is acquired by utilizing the waste heat of the waste air and/or of the obtained oxygen, in that the rest of the heating of the fresh air is realized through external energy supply, and in that the ratio of fresh air to generated oxygen in normal operation is adjusted within the limits of 6:1 and 25:1. The rest of the heating can be carried out by electric heating or combustion processes. The thermal energy required for heating the fresh air is advantageously obtained through the use of regenerative heat exchangers. The membrane separation process according to the invention is especially efficient when the oxygen is removed by vacuum on the permeate side, but the feed gas is introduced at ambient pressure. Vacuum generation is carried out through electromechanical vacuum pumps, mechanical vacuum pumps or steam jet pumps. The air throughput is advantageously controlled such that the oxygen partial pressure in the waste air is no more than 100 mbar, but preferably less than 20 mbar, above vacuum pressure on the permeate side.

According to the invention, the optimal operating conditions of a MIEC membrane plant are derived from the known equations for oxygen transport, the heat recovery efficiency of the regenerative heat exchanger to be used, and the real compression energy demand. The level of oxygen permeation and the utilized MIEC membrane material can be ignored because, in contrast to the known prior art, they have only an insignificant influence on the own energy demand and the derived equations are independent of oxygen permeation by normalizing to the generated amount of oxygen. As a result, in contrast to the prior art described above, the oxygen permeation merely affects the plant size and, accordingly, chiefly investment costs. Thus, with respect to energy consumption, the changed plant size results in the secondary effect of higher heat losses which are typically under 5% of the total energy demand of larger plants. Therefore, according to the invention, the absolute level of oxygen permeation can be ignored for energy assessment.

An oxygen permeation from the feed side to the permeate side or vacuum side takes place in MIEC membranes provided that the oxygen partial pressure is greater on the feed gas side than on the sweep gas side or permeate side. If the oxygen permeation through the membrane is high compared to the feed gas throughput, a relatively large amount of oxygen is extracted from it. The oxygen partial pressure on the feed side accordingly decreases along the membrane as does the local oxygen permeation. This depletion of oxygen can be described by $O_2$ recovery $f_{ORec}$.

An extensive utilization of the installed membrane surfaces results when the oxygen partial pressure in the feed gas $p_{OFout}$ virtually corresponds to the oxygen partial pressure in the sweep gas or permeate $p_{OSout}$ after membrane contact, i.e., $p_{OFout} \approx p_{OSout}$. This aimed-for limiting value of the two pressures corresponds to the achievement of an equilibrium oxygen partial pressure $p_{OEq}$ and can be calculated from the $O_2$ recovery $f_{ORec}$, as follows:

$$p_{OEq} = p_{OFout} = \frac{p_{OFin}(1 - f_{ORec})}{1 - f_{ORec} p_{OFin}} \approx p_{OSout} \quad (1)$$

At the same time, the $O_2$ recovery is directly related to the surface area-specific feed gas throughput at the feed gas input $j_{Fin}$, the oxygen partial pressure at the feed gas input $p_{OFin}$ and the oxygen permeation $j_{O2}$:

$$f_{ORec} = \frac{j_{O_2}}{j_{Fin} p_{OFin}} \quad (2)$$

Accordingly, the $O_2$ recovery $f_{ORec}$ can be used directly for calculation of the required surface area-specific air throughput $j_{Fin}$. It also has an effect on the oxygen permeation corresponding to the influence of the effective oxygen partial pressure in the feed gas.

BRIEF DESCRIPTION OF THE DRAWINGS

The invention will be described more fully in the following with reference to embodiment examples. The accompanying drawings show.

DETAILED DESCRIPTION OF EMBODIMENTS OF THE INVENTION

Figure 1:
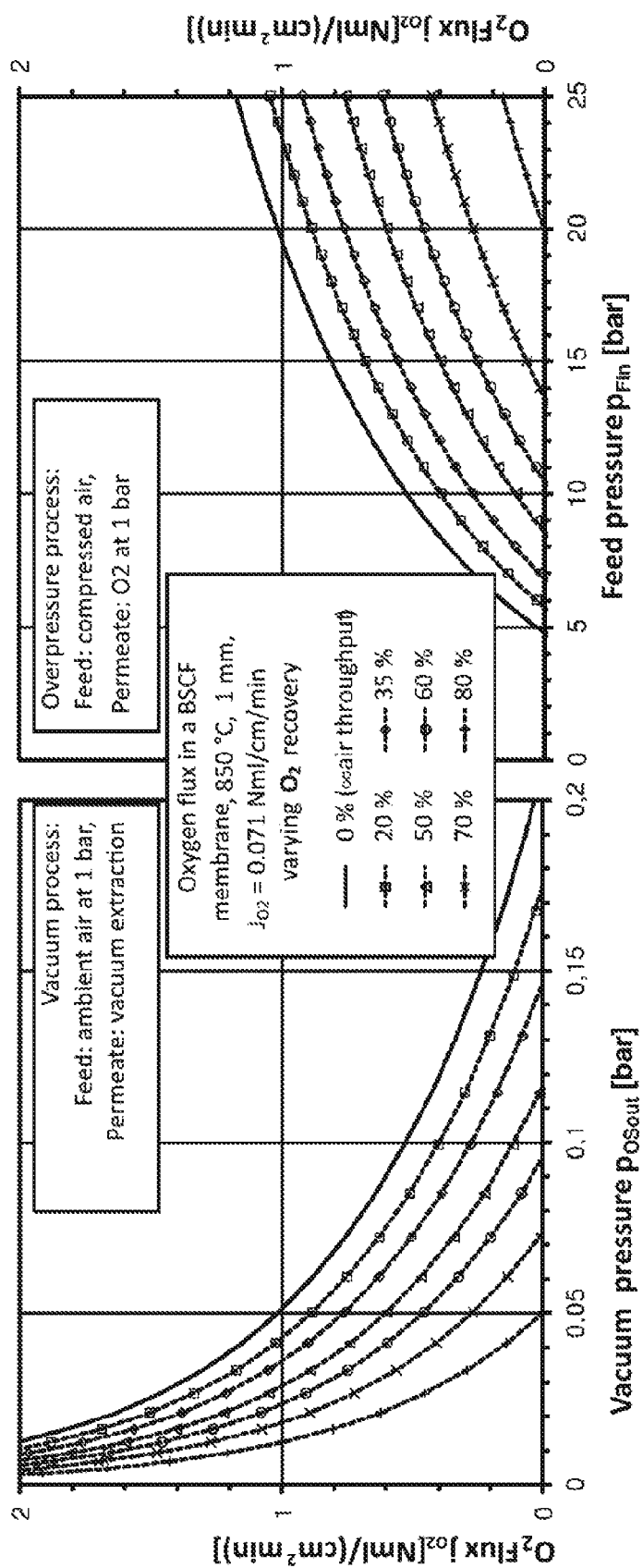
FIG. 1 the oxygen throughput in vacuum operation and overpressure operation (BSCF, 850° C.) for different $O_2$ recoveries.

FIG. 1 shows the oxygen permeation for vacuum operation and overpressure operation for tubular BSCF membranes and different $O_2$ recoveries, which oxygen permeation is calculated according to a simplified Wagner equation. It is clear that increasing $O_2$ recoveries lead to a sharp reduction in oxygen permeation. It is also clear that an oxygen permeation first occurs below a determined vacuum pressure on the permeate side or above a determined overpressure on the feed side, and this limiting equilibrium oxygen partial pressure $p_{OEq}$ is determined by the $O_2$ recovery.

It is clear from FIG. 1 that the vacuum process leads to an ever greater increase in oxygen permeation as the vacuum pressure decreases. In contrast, in the overpressure process the further increase in oxygen permeation flattens out increasingly. Further, the overpressure process requires recovery of compression energy which would mean a disproportionately high expenditure for small plants. Corresponding compressors and expansion turbines with a sufficiently high efficiency are not available to date. Therefore, contrary to the majority of current publications, the construction of an energy-efficient MIEC membrane plant for oxygen generation is oriented to a vacuum process.

Figure 2:
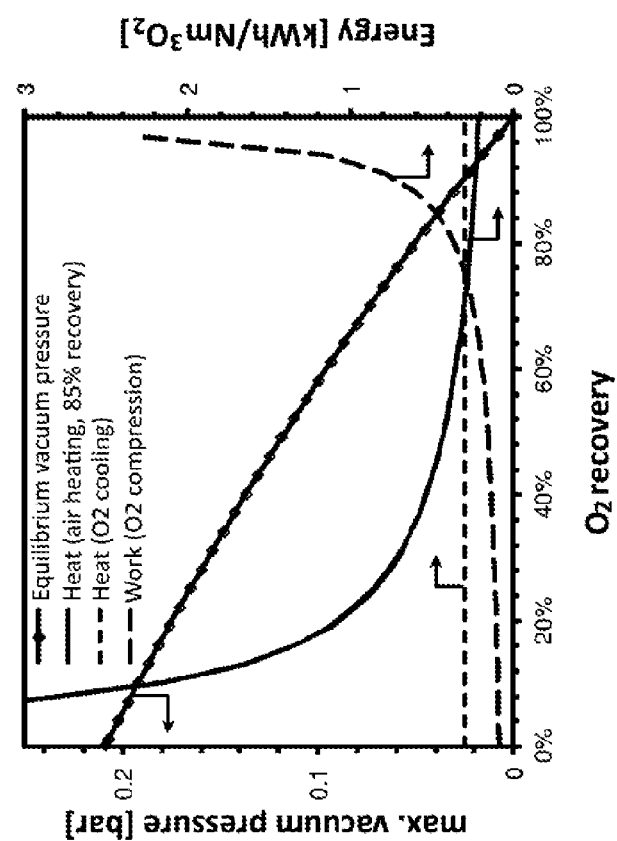
FIG. 2 the equilibrium oxygen partial pressure and energy demand for air heating (at 85% heat recovery), oxygen compression, oxygen cooling.

Modelings of the overall process show that the entire energy demand of the process depends decisively on the $O_2$ recovery and all of the process parameters relevant for energy can be calculated directly from the $O_2$ recovery. Accordingly, FIG. 2 shows the curve of the equilibrium oxygen partial pressure $p_{OEq}$ and the energy demand for air heating, incl. 85% heat recovery, for cooling the oxygen and for compressing the oxygen to ambient pressure. Calculation of the compression energy in the vacuum process was based on the compression energy of conventional vacuum pumps resulting from suction power and nominal throughput. The most energy-efficient commercial vacuum pumps achieve minimum values of 0.015 $kWh_{el}/Sm^3$ ($Sm^3$=suction $m^3$). A value of 0.018 $kWh_{el}/Sm^3$ was used for the calculation.

Figure 3:
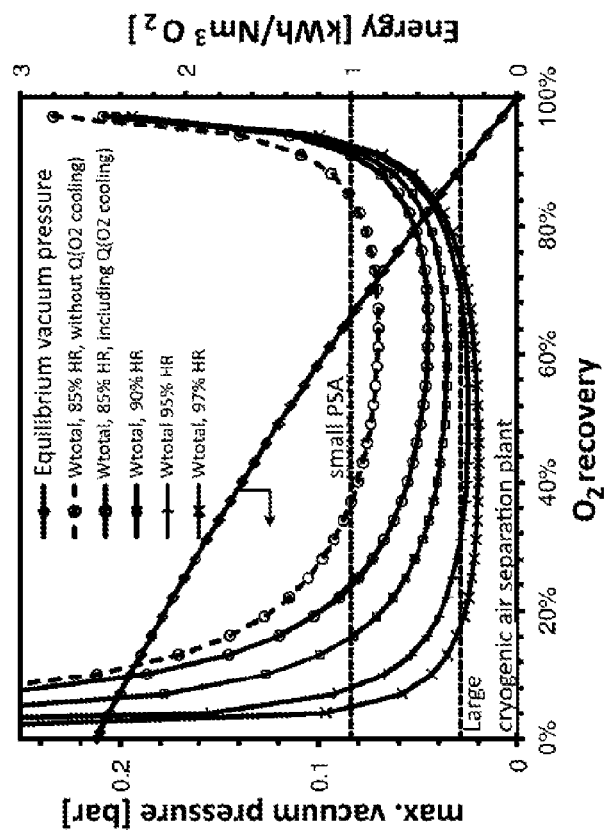
FIG. 3 the equilibrium oxygen pressure and vacuum pressure and the total energy demand $W_{total}$ for oxygen compression, oxygen cooling and air heating at different heat recoveries (HR)

All energy values indicated in FIG. 2 are normalized to the amount of oxygen generated. Therefore, they can easily be used to calculate the total energy demand $W_{total}$. FIG. 3 shows the total energy demand $W_{total}$ of the vacuum process for different heat recoveries of the utilized heat exchangers which use the waste heat of the oxygen-depleted waste air to heat the fresh air. At 85% HR (heat recovery) of the heat exchanger and 0.018 $kWh_{el}/Sm^3$, the total energy consumption already lies just below that of a decentralized PSA plant even without utilizing the waste heat from the oxygen cooling.

If the waste heat from oxygen cooling is also utilized for preheating air, an appreciably lower specific energy consumption of 0.55 $kWh/Nm^3$ $O_2$ can already be achieved in the range of optimal $O_2$ recovery. Obviously, a higher heat recovery efficiency of the air/waste air heat exchanger leads to an appreciable reduction in the specific energy consumption of the process. Further, with higher HR values the range of the minimum specific energy consumption expands, the minimum is less pronounced and is shifted to lower $O_2$ recoveries. Accordingly, compared to lower HR values of the heat exchangers, it is still possible to separate oxygen in an energy-efficient manner at appreciably higher vacuum pressure. For example, while the maximum permissible vacuum pressure is about 90 mbar at the minimum of the energy demand curve for 85% HR, it climbs to 133 mbar at 97% HR. Accordingly, it is possible to use smaller vacuum pumps with higher heat recovery and to further decrease the share of energy for compression in the total specific energy demand.

Already at 97% HR, the specific energy demand of the MIEC membrane process can fall below a value of 0.3 $kWh/Nm^3$ $O_2$ if $O_2$ recoveries of 20% to approximately 70% and resulting ratios of fresh air amount to produced oxygen of 24:1 to 6.8:1 are maintained. Therefore, a considerable energy advantage is achieved according to the invention compared to the prior art (cryogenic air separation plants, decentralized PSA plants).

As an alternative to controlling the air amount in proportion to the oxygen produced, the oxygen partial pressure at the feed output $p_{OFout}$ can be used for realizing an energy-efficient operating mode. To this end, the oxygen partial pressure at the feed output $p_{OFout}$ and the vacuum pressure or the oxygen partial pressure on the permeate side $p_{OSout}$, which is identical to the latter, are continuously measured. The air throughput is adapted by control technology in such a way that the oxygen partial pressure at the feed output $p_{OFout}$ lies above the vacuum pressure $p_{OSout}$ by no more than 100 mbar, but, in a preferred constructional variant, by no more than 20 mbar. Therefore, a sufficiently low air throughput and a correspondingly high $O_2$ recovery are realized within a wide operating range in order to ensure an energy-efficient operation.

A highly energy-efficient MIEC membrane plant is characterized according to the invention by heating the fresh air via regenerative heat exchangers which utilize more than 85%, in a preferred constructional variant more than 95%, of the thermal energy contained in the waste air and which utilize the waste heat released during the cooling of the oxygen to heat air. The driving force for the oxygen transport is generated through application of a vacuum because, in this way, the compression energy to be expended is minimized and need not be recovered. According to the invention, the membrane plant is operated such that in normal operation a ratio of the entering fresh air amount to the produced oxygen amount of 25:1 is not exceeded and does not fall below a ratio of 6:1. The required residual heat for maintaining the operating temperature of the membrane plant is acquired through supplemental electrical heating or by metered injection of small amounts of fuel. Accordingly, in the latter case, a further reduction in the consumption of electrical energy can be achieved.

EMBODIMENT EXAMPLE 1

Figure 4:
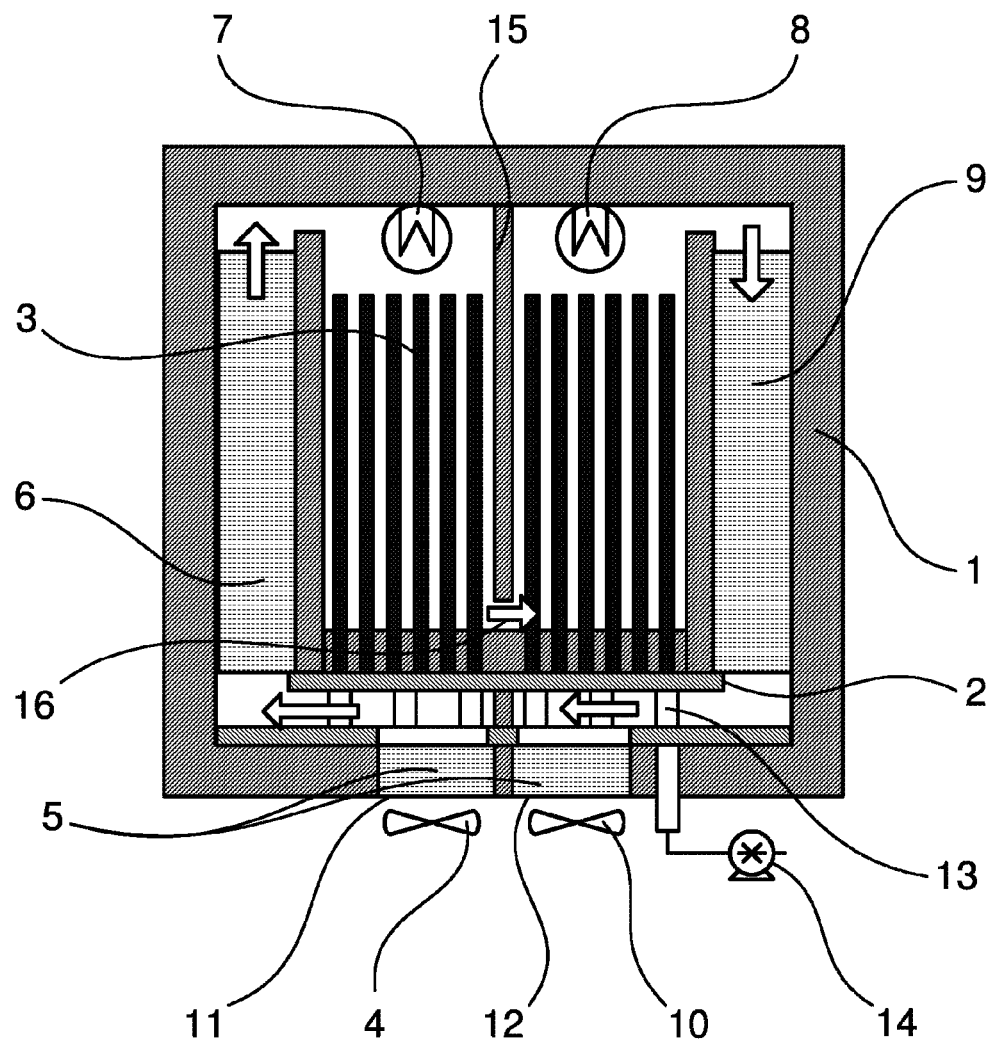
FIG. 4 a schematic diagram of a membrane module for oxygen production in vacuum operation with stationary regenerative heat exchangers.

The membrane plant for energy-efficient oxygen production shown schematically in FIG. 4 comprises, according to the invention, a housing 1 which is not pressure-tight and which has a metal connection plate 2 in which tubular BSCF membranes 3 which are closed on one side were inserted by means of silicon seals. A dividing wall 15 with orifice 16 divides the interior of the housing into two chambers which are constructed in a mirror-symmetrical manner with respect to the path of fresh air. In cycle phase A, the fresh air is sucked in via a speed-controlled fan 4 arranged upstream of the input 11, preheated by a regenerative heat exchanger 5 and guided through the partitioned connection plate 2 in order to absorb the heat of the extracted oxygen. Subsequently, the fresh air is guided through a stationary regenerator 6 for further heating and is post-heated to operating temperature by the supplemental heater 7. The air stream passes the tubular BSCF membranes 3 and the second supplemental heater 8 and delivers its heat to the further stationary regenerator 9. The oxygen-depleted air stream which is already highly cooled is subsequently guided through the metal connection plate 2 to the regenerative heat exchanger 5 to those regions upstream of the output 12, where further heat is extracted from it. The speed-controlled fan 10 downstream of the output 12 works in suction mode in cycle phase A. The metal connection plate 2 contains a vacuum-tight hollow space structure 13 which communicates with the tubular BSCF membranes 3. The hollow space of this hollow space structure 13 is suctioned through an external vacuum pump 14. The pure oxygen is subsequently available at ambient pressure.

After a corresponding cycling time, the streaming direction of the air stream is reversed either through suitable air flaps, not shown, or by reversing the running direction of the fans 4 and 10. Consequently, all of the gas streams are reversed in this cycle phase B. In this way, the heat contained in the hot waste air and the heat transferred through the oxygen to the metal connection plate 2 is extensively recovered. The air throughput is controlled through the speed-controlled fans 4 and 10 such that the oxygen partial pressure after membrane contact is a maximum of only 100 mbar, preferably, according to the invention, only about 20 mbar, above the oxygen partial pressure on the permeate side. Therefore, when these specifications are complied with, a low air surplus and mean $O_2$ recovery of 30 to 70% and, accordingly, an energy-efficient operation are ensured.

EMBODIMENT EXAMPLE 2

Figure 5:
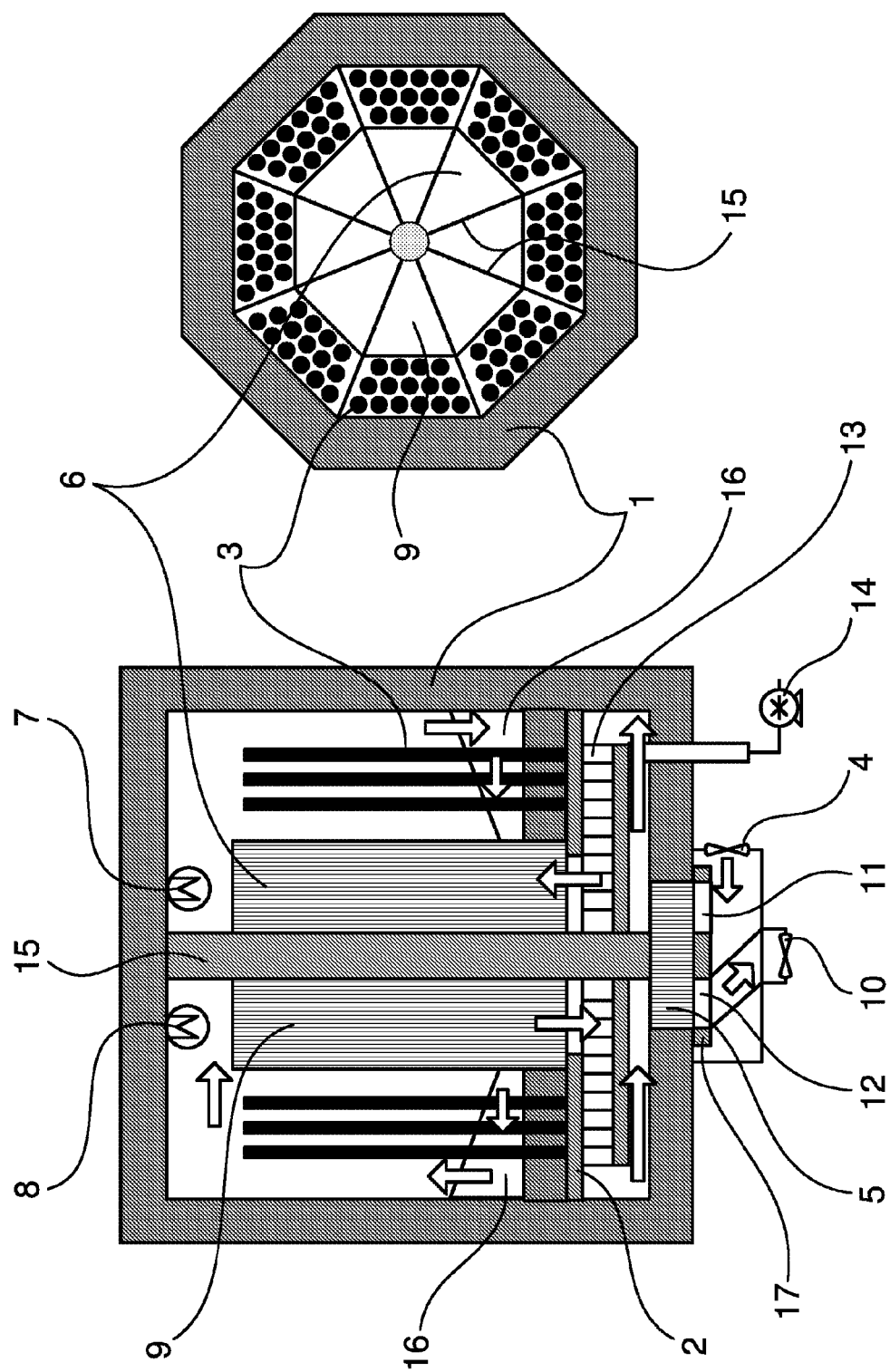
FIG. 5 a schematic diagram of a MI EC membrane module for oxygen production in vacuum operation with rotatingly traversed regenerative heat exchangers and rotary slide.

The membrane plant for oxygen production shown schematically in FIG. 5 comprises, according to the invention, a housing 1 which is not pressure-tight and which has a metal connection plate 2 in which tubular BSCF membranes 3 which are closed on one side were inserted by means of cable fittings. The housing 1 is octagonal and is divided into eight chambers by eight dividing walls 15, each dividing wall being provided with an orifice 16 in the region of the connection plate 2 so that fresh air can stream through all of the chambers. The fresh air is sucked in via the speed-controlled fan 4 which is arranged upstream of the input 11. The input 11 is located on a rotary slide 17 and has dimensions sufficient to allow fresh air to stream into three chambers simultaneously. The output 12 is likewise located on the rotary slide 17 and is preferably dimensioned identically to input 11 and lies opposite input 11. The regenerative beat exchanger 5 directly downstream of the input 11 is dimensioned at least such that areas of the input 11 and output 12, respectively, are constantly covered as the rotary slide revolves by 360°. The fresh air sucked in through the input 11 by the upstream fan 4 is initially heated through regions of the regenerative heat exchanger 5. Further heating takes place by sweeping past the segmented connection plate 2 and the downstream stationary regenerators 6 of the three chambers downstream of the input. The supplemental heaters 7 arranged in the cover region are used to post-heat the air stream. As an alternative to electrical heating, heating can also be carried out by small amounts of fuel gas. The heated fresh air subsequently streams downward between the dividing walls 15 and through the orifices 16 into the opposed chambers. The fresh air which is already depleted is now directed upward past the tubular BSCF membranes 3 and supplemental heaters 8 via the stationary regenerators 9 of the respective chambers. Finally, the extensively cooled fresh air is directed through the partitioned connection plate 2 and streams through those areas of the regenerative heat exchanger 5 which are opened by the output 12. In so doing, additional heat is extracted from the waste air stream. The speed-controlled downstream fan 10 operates continuously in suction mode. The metal connection plate 2 contains a vacuum-tight hollow space structure 13 in which the obtained oxygen collects and is accordingly extracted through an external vacuum pump 14. A permanent reversal of the fresh air feed direction with respect to the opposed chambers is effected through the constant rotation of the rotary slide 17, i.e., the input 11 lies at the output 12, and vice versa, after 180-degree rotation of the rotary slide 17.

As a result of the construction shown here, the heat contained in the hot waste air and the heat transferred through the oxygen to the metal connection plate 2 is extensively recovered. The air throughput is controlled through the fan 4 upstream of the rotary slide 17 and the downstream fan 10 with variable speed such that the air throughput is 12 to 18 times the oxygen production rate.

LIST OF REFERENCE NUMERALS

1 housing
2 connection plate
3 tubular BSCF membranes
4 upstream fan
5 regenerative heat exchanger
6 regenerator
7 supplemental heater
8 supplemental heater
9 regenerator
10 downstream fan
11 input
12 output
13 hollow space structure
14 vacuum pump
15 dividing wall
16 orifice
17 rotary slide

What is claimed is:

1. A membrane separation process for energy-efficient generation of oxygen from fresh air, wherein the process is a stand-alone process, mixed conducting membranes in vacuum operation are used, the fresh air is discharged as waste air after separation of the oxygen, at least 85% of the thermal energy required for heating the fresh air is acquired by utilizing the waste heat of the waste air and/or of the obtained oxygen, the rest of the heating of the fresh air is realized through external energy supply, and a volume ratio of fresh air to generated oxygen in normal operation is adjusted to a range of from 6:1 to 25:1.

2. The membrane separation process of claim 1, wherein the rest of the heating is carried out by electric heating or a combustion process.

3. The membrane separation process of claim 1, wherein the thermal energy required for heating the fresh air is obtained through the use of regenerative heat exchangers.

4. The membrane separation process of claim 1, wherein the oxygen is removed by vacuum on the permeate side, the feed gas is introduced at ambient pressure, and vacuum generation is carried out through at least one of an electro-mechanical vacuum pump, a mechanical vacuum pump or a steam jet pump.

5. The membrane separation process of claim 1, wherein the air throughput is controlled such that an oxygen partial pressure in the waste air is not higher than 100 mbar above a vacuum pressure on a permeate side.

6. The membrane separation process of claim 5, wherein the oxygen partial pressure in the waste air is less than 20 mbar above the vacuum pressure on the permeate side.

7. The membrane separation process of claim 2, wherein the air throughput is controlled such that an oxygen partial pressure in the waste air is not higher than 100 mbar above a vacuum pressure on a permeate side.

8. The membrane separation process of claim 7, wherein the oxygen partial pressure in the waste air is less than 20 mbar above the vacuum pressure on the permeate side.

9. The membrane separation process of claim 1, wherein more than 95% of the thermal energy required for heating the fresh air is acquired by utilizing the waste heat of the waste air and/or of the obtained oxygen.

10. A membrane plant for energy-efficient production of oxygen from fresh air, wherein
the plant comprises a housing with an input and an output, MIEC (Mixed Ionic Electronic Conductor) membranes and a vacuum pump,
a metal connection plate is arranged in the housing, which metal connection plate comprises a vacuum-tight hollow space structure in which the MIEC membranes which are closed on one side are arranged in a gastight manner,
at least one dividing wall for dividing into chambers is present, each chamber comprising a stationary regenerator, a supplemental heater and a portion of the MIEC membranes, and an orifice is present in every dividing wall to ensure passage for the fresh air from a chamber downstream of the input to a chamber upstream of the output,
an upstream fan is arranged upstream of the input,
a downstream fan is arranged downstream of the output, the upstream fan and the downstream fan having opposite suction directions,
a regenerative heat exchanger is present, partial regions being associated with the input and other partial regions being associated with the output, and
the vacuum pump communicates with the hollow space structure for sucking out the obtained oxygen.

11. The membrane plant of claim 10, wherein the housing is not pressure-tight.

12. The membrane plant of claim 10, wherein the opposite suction directions are reversibly adjustable.

13. The membrane plant of claim 10, wherein the upstream fan and the downstream fan are arranged on a rotary slide such that during rotation of the rotary slide the input moves from the chamber downstream of the input to the respective adjacent chamber and, consequently, the output moves from the opposite chamber to the adjacent chamber.

14. The membrane plant of claim 13, wherein the input and, consequently, the output extend over a plurality of adjacent chambers.

15. The membrane plant of claim 11, wherein the opposite suction directions are reversibly adjustable.

16. The membrane plant of claim 11, wherein the upstream fan and the downstream fan are arranged on a rotary slide such that during rotation of the rotary slide the input moves from the chamber downstream of the input to the respective adjacent chamber and, consequently, the output moves from the opposite chamber to the adjacent chamber.

17. The membrane plant of claim 16, wherein the input and, consequently, the output extend over a plurality of adjacent chambers.

* * * * *